United States Patent
Xia et al.

(10) Patent No.: US 7,773,030 B2
(45) Date of Patent: Aug. 10, 2010

(54) METHOD AND SYSTEM FOR ANTENNA TRAINING AND COMMUNICATION PROTOCOL FOR MULTI-BEAMFORMING COMMUNICATION

(75) Inventors: Pengfei Xia, Mountain View, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 136 days.

(21) Appl. No.: 12/183,648

(22) Filed: Jul. 31, 2008

(65) Prior Publication Data

US 2010/0026560 A1 Feb. 4, 2010

(51) Int. Cl.
*G01S 7/40* (2006.01)
(52) U.S. Cl. ........................................ 342/173; 455/22
(58) Field of Classification Search ................... 342/173
See application file for complete search history.

(56) References Cited

U.S. PATENT DOCUMENTS

| 7,627,286 | B2 * | 12/2009 | Webster et al. ............. 455/13.3 |
| 2003/0139139 | A1 | 7/2003 | Onggosanusi et al. |
| 2009/0233556 | A1 | 9/2009 | Xia et al. |

FOREIGN PATENT DOCUMENTS

| KR | 1020040032985 A | 4/2004 |
| KR | 1020040032985 A | 4/2008 |

OTHER PUBLICATIONS

P. Comon and G. Golub, "Tracking a few extreme singular values and vectors in signal processing", Proceedings of IEEE, vol. 78, No. 8, pp. 1327-1343, Aug. 1990.
Van Veen, B.; and Buckley, K., "Beamforming: A Versatile Approach to Spatial Filtering," IEEE ASSP Magazine, vol. 5, pp. 4-24, Apr. 1988.
Notification of Transmittal of the International Search Report and Written Opinion of the International Searching Authority issued in PCT International Application No. PCT/KR2009/004288, Feb. 26, 2010, 11 pp. Korean Intellectual Property Office, Republic of Korea.

* cited by examiner

*Primary Examiner*—Thomas H Tarcza
*Assistant Examiner*—Timothy A Brainard
(74) *Attorney, Agent, or Firm*—Kenneth L. Sherman, Esq.; Michael Zarrabian, Esq.; Myers Andras Sherman LLP

(57) ABSTRACT

A method and system for antenna training for communication of multiple parallel data streams between multiple-input multiple-output communication stations is provided. An implementation involves performing antenna training by obtaining optimal antenna training coefficients by multi-stage iteration in estimating the multi-dimensional beamforming coefficients.

33 Claims, 4 Drawing Sheets

METHOD AND SYSTEM FOR ANTENNA TRAINING AND COMMUNICATION PROTOCOL FOR MULTI-BEAMFORMING COMMUNICATION

FIELD OF THE INVENTION

The present invention relates generally to data communications and in particular to beamforming communications.

BACKGROUND OF THE INVENTION

In communication systems including transmitters and receivers, antenna array beamforming provides increased signal quality (high directional antenna beamforming gain) and an extended communication range by steering the transmitted signal in a narrow direction. For this reason, such beamforming has been widely adopted in radar, sonar and other communication systems.

Antenna training approaches have been proposed for transmit and receive beamforming with one-dimensional operations. However, such training approaches cannot be applied or used for multiple dimension beamforming (multi-beamforming, also known as transmit precoding).

BRIEF SUMMARY OF THE INVENTION

The present invention provides a method and system for antenna training. One embodiment involves performing antenna training for multi-dimensional beamforming data communication between multiple-input multiple-output communication stations, wherein the antenna training includes obtaining optimal antenna training coefficients by multi-stage iteration in estimating the multi-dimensional beamforming coefficients.

Estimating the multi-dimensional beamforming coefficients may include: a source station obtaining a transmit beamforming vector that is orthogonal to prior transmit beamforming vectors from earlier stages; the source station transmitting a training sequence modulated by the obtained transmit beamforming vector in the spatial domain; a destination station receiving the training sequence modulated by the obtained transmit beamforming vector, and obtaining a receive beamforming vector therefrom, such that the receive beamforming vector is orthogonal to prior receive beamforming vectors; the source station transmitting a training sequence modulated by different transmit beamforming vectors; the destination station receiving said training sequence modulated by different transmit beamforming vectors, and estimating a transmit beamforming vector therefrom; and the destination station feeding back the estimated transmit beamforming vector to the source station, whereby the source station decodes/transforms back the fed back transmit beamforming vector.

Estimating the multi-dimensional beamforming coefficients may alternatively include: a source station obtaining a transmit beamforming vector that is orthogonal to prior transmit beamforming vectors from earlier stages; the source station transmitting a training sequence modulated by the obtained transmit beamforming vector in the spatial domain; a destination station receiving the training sequence modulated by the obtained transmit beamforming vector, and computing a receive beamforming vector therefrom, such that the computed receive beamforming vector is orthogonal to prior receive beamforming vectors; the destination station transmitting a training sequence modulated by the computed receive beamforming vector, or complex conjugate of the computed receive beamforming vector, in the spatial domain; and the source station receiving the training sequence from the destination station and estimating a transmit beamforming vector therefrom.

These and other features, aspects and advantages of the present invention will become understood with reference to the following description, appended claims and accompanying figures.

DETAILED DESCRIPTION OF THE INVENTION

Figure 1:
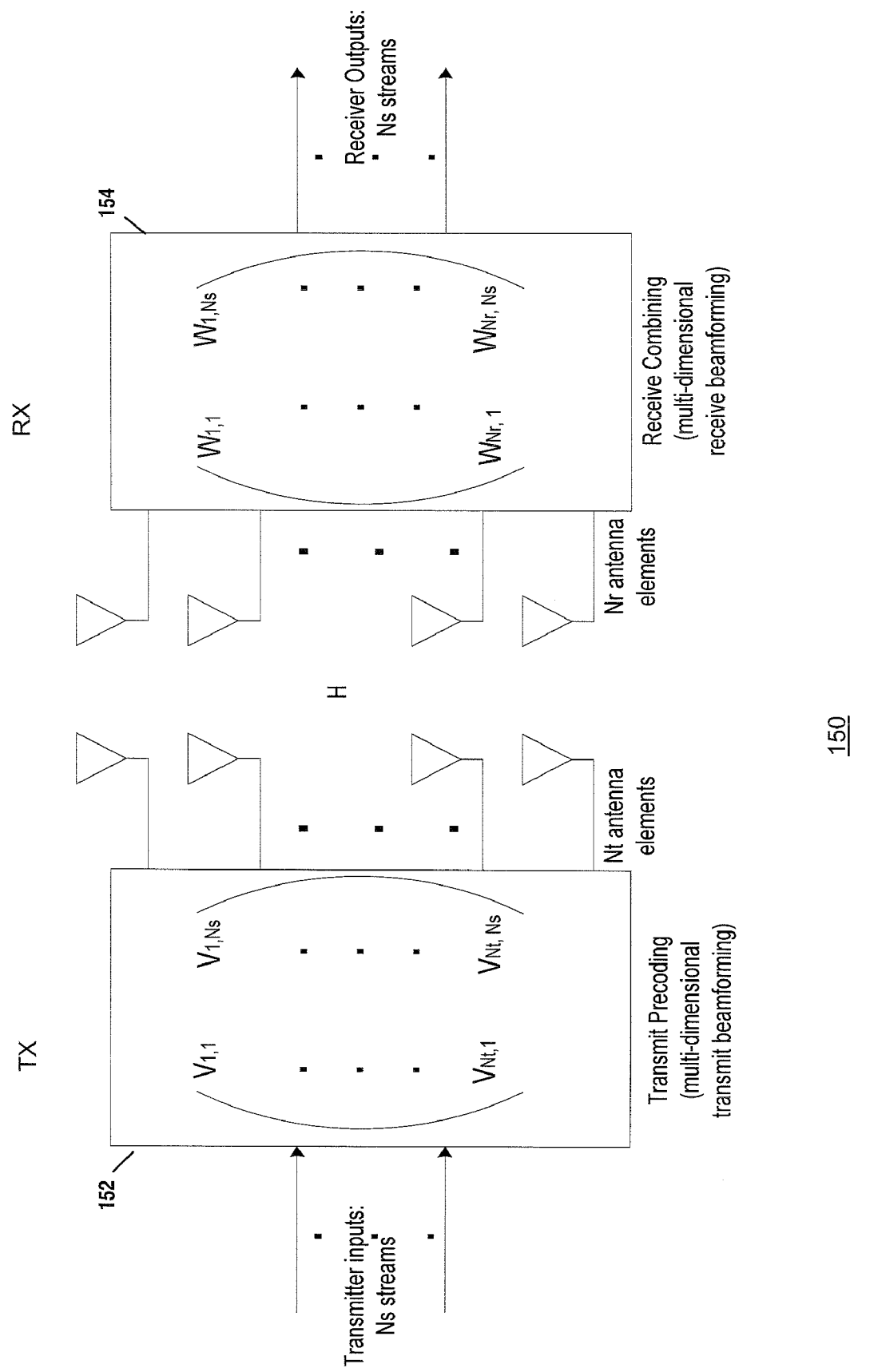
FIG. 1 shows a functional block diagram of a transmit precoding function and a receive combining function implementing multi-beamforming in a communication system, according to an embodiment of the invention.

The present invention provides a method and system for antenna training and communication protocol for multi-dimensional beamforming (multi-beamforming) at both a transmitter and a receiver in a communication system. Antenna arrays are used at both the transmitter and the receiver and need be trained before payload data is transmitted therebetween. The present invention provides an efficient (low complexity) approach for training antennas at transmitter and receiver sides in multi-dimensional beamforming communications.

Two example embodiments of the invention are described below. In a first embodiment, instead of using full singular value decomposition (SVD) to obtain trained antenna array vectors (beamforming coefficients) for transmitter and receiver sides, a matrix iterative algorithm (MIA) is utilized based on reduced rank SVD operations. Compared to full SVD (which is a onetime effort), the MIA algorithm is an iterative algorithm which requires considerably less computation complexity than the full SVD. The MIA does not rely on full SVD to obtain essentially optimal antenna array beamforming coefficients (optimal training vectors) at the transmitter and receiver sides for multi-beamforming communication. MIA is a one stage algorithm, with multiple iterations in the one stage.

In a second embodiment, vector iterative algorithm (VIA) is utilized. The VIA reduces computation complexity by completely avoiding SVD. Compared to MIA which includes only one stage with multiple iterations, the VIA includes multiple stages with each stage including multiple iterations. The VIA does not rely on SVD at all to obtain essentially optimal array beamforming coefficients (optimal training vectors) at the transmitter and receiver sides for multi-beamforming communication. VIA is a serial multi-stage algorithm, with one stage following the other. Multiple iterations are performed within each stage. In both MIA and VIA embodiments, optimal training vectors are obtained with computational efficiency. As noted, the MIA requires only one stage with multiple iterations, but at higher computation complexity relative to VIA which requires multiple stages.

The communication medium can be wireless, copper, optical and others. The invention can be useful with very high throughput wireless communications, such as IEEE 802.15.3c and ECMA standards on millimeter wave (mm-wave) communication networks (ECMA international organization ECMA-60 GHz wireless protocol), and implementation of Wireless HD standard on uncompressed video transmission. WirelessHD (WiHD) is an industry-led effort to define a wireless digital network interface specification for wireless HD digital signal transmission on the 60 GHz frequency band, e.g., for consumer electronics (CE) and other electronic products. An example WirelessHD network utilizes a 60 GHz-band mm-wave technology to support a physical (PHY) layer data transmission rate of multi-Gbps (gigabits per second), and can be used for transmitting uncompressed high definition television (HDTV) signals wirelessly. The present invention is useful with other wireless communication systems as well.

FIG. 1 shows a functional block diagram of a communication system 150, according to an embodiment of the invention. The system 150 implements preceding, or multi-dimensional beamforming for MIMO (multi-input multi-output) communication. The system 150 includes a transmitter (Tx) preceding function 152 and a receiver (Rx) combining function (i.e., receive antenna training function) 154.

In an antenna training phase, the function 152 performs multi-beamforming transmit antenna training function and the function 154 performs multi-beamforming receive antenna training function. In the antenna training phase, the functions 152 and 154 cooperate in determining multi-beamforming transmit coefficients V and multi-beamforming receive coefficients W, as discussed in detail further below in conjunction with FIGS. 2 and 3.

In the data payload communication phase, the transmitter preceding function 152 applies a transmit preceding operation on multiple (Ns) input streams, and converts the Ns streams to a plurality (Nt) of transmit streams, where Nt is the number of transmit antennas. The conversion is performed using a matrix product by multiplying the input $$\text{streams by an } Nt \times Ns \text{ precoding matrix } V = \begin{bmatrix} v_{1,1} & \cdots & v_{1,Ns} \\ \vdots & \ddots & \vdots \\ v_{Nt,1} & \cdots & v_{Nt,Ns} \end{bmatrix}.$$

The precoded Nt streams are then transmitted through the Nt antenna elements at transmitter side, which after channel propagation are received as Nr streams at receiver side, wherein Nr is the number of receive antennas.

The receiver combining function 154 applies receive combining operations on the Nr received streams and converts the received streams back to Ns streams, which is the number of original data streams at transmitter side before preceding. The conversion at the receiver side is performed using matrix product by multiplying the received Nr streams by an Ns×Nr matrix, or the conjugate transpose version of $$W = \begin{bmatrix} w_{1,1} & \cdots & w_{1,Ns} \\ \vdots & \ddots & \vdots \\ w_{Nr,1} & \cdots & w_{Nr,Ns} \end{bmatrix}.$$

In such a system, Nt>=Ns, Nr>=Ns. The following examples focus on the cases where Nt>>Ns, Nr>>Ns, while Nt and Nr are on the same order. For example in WiHD 1.0, Nt=Nr=36 while Ns=1. Without loss of generality, we assume Nr=Nt=N in this example (in general Nt and Nr can be different).

The wireless channel can be represented as a matrix channel H, wherein $$H = \begin{bmatrix} h_{1,1} & \cdots & h_{1,N} \\ \vdots & \ddots & \vdots \\ h_{N,1} & \cdots & h_{N,N} \end{bmatrix}.$$

$$\text{Let } S = \begin{bmatrix} s_1 \\ \vdots \\ s_{Ns} \end{bmatrix}, \text{ and } R = \begin{bmatrix} r_1 \\ \vdots \\ r_{Ns} \end{bmatrix},$$

be the information symbols representing the Ns streams at the transmitter side and the receiver side, respectively. The input-output relationship can be expressed as: $R = W^H HVS$.

Noise has not been considered here to simplify understanding. Further, we consider a flat channel for ease of explanation. Nevertheless, the process can be similarly extended to include noise and non-flat channel, and to multi-carrier systems, such as orthogonal frequency division multiplexing (OFDM), or single carrier block transmission. Example communication systems for which the invention is useful include, e.g., single carrier flat fading systems with no inter-symbol interference, single carrier block transmission systems with cyclic prefix, OFDM systems.

The preceding function 152 at the transmitter involves multi-dimensional transmit beamforming. The combining function 154 at the receiver involves multi-dimensional receive beamforming. The term multi-dimensional refers to the fact that in general Ns>=1. In the special case of Ns=1, the process involves transmit beamforming at the transmitter and receive beamforming at the receiver.

In implementation, as noted the actual communication is divided into two phases. In an antenna training phase, a preceding matrix V (including multi-beamforming transmit coefficients) is computed by the preceding function 152, and a combining matrix W (including multi-beamforming receive coefficients) is computed by the combining function 154, as multi-beamforming vectors for the transmitter and receiver. Then, in a payload phase, actual data payload is communicated via a beamformed high gain communication link using V and W for beam steering. In essence, antennas have to be trained first to obtain transmit multi-beamforming coefficient matrices V, and receive multi-beamforming coefficient matrices W, before the antennas are used to deliver high throughput data. As noted, the invention provides an iterative process for determining optimal antenna array multi-beamforming coefficients (i.e., essentially optimal training vectors V and W at the transmitter and receiver sides, respectively), as described in further detail below.

Given an arbitrary channel matrix H of size N×N, the singular value decomposition of H can be expressed as: $H = UST^H$, where U is an N×N semi-unitary matrix with $U^H U = I$, N×N diagonal matrix containing the singular values in a decreasing order on the diagonal, and T is an N×N unitary matrix with $TT^H = I$. In the case that Nr<Nt, or Nr>Nt, similar results may be obtained.

Optional solution of V and W can be selected based on U, T, and the left and right singular matrices of the channel matrix H. In particular, V is selected as the first Ns columns of the matrix T, the right singular matrix of H, wherein:

$$V = \begin{bmatrix} T_{1,1} & \cdots & T_{1,Ns} \\ \vdots & \ddots & \vdots \\ T_{N,1} & \cdots & T_{N,Ns} \end{bmatrix}.$$

Further, W is selected as the first Ns columns of the matrix U, the left singular matrix of H, wherein:

$$W = \begin{bmatrix} U_{1,1} & \cdots & U_{1,Ns} \\ \vdots & \ddots & \vdots \\ U_{N,1} & \cdots & U_{N,Ns} \end{bmatrix}.$$

However, the computational complexity based on required full SVD operations to obtain U and T for a given matrix H of size N×N, is very high (i.e., in the order of $N^3$). According to embodiments of the invention, however, essentially optimal solutions of V and W are obtained using said MIA and VIA processes, without pursuing the high computational complexity of the full SVD for H.

Consider any matrix of size N×N: $H=U_H S_H T_H^H$. Suppose B satisfies $B^H B = I_{NS}$ is an N×$N_s$ semi-unitary matrix. In an example implementation according to the invention, B is fixed as the first Ns columns of a size N×N identity matrix. We now consider the SVD of the product C=HB, which is also an N×Ns matrix. It can be inferred that: $C=U_H S_H T_H^H B$, thus for SVD of C, we have $U_c=U_H$, $S_c=S_H$, $T_c=B^H T_H$ where $U_c$, $S_c$, and $T_c$ represent the left singular matrix, diagonal singular values, and right singular matrix of C, respectively. In essence, matrix HB and H share the same left singular matrix $U_c=U_H$ and diagonal values $S_c=S_H$ when $B^H B = I_{Ns}$.

On the other hand, $H^H = T_H S_H U_H^H$, wherein $T_H$, $S_H$, $U_H$ are left singular matrix, diagonal singular values and right singular matrix of $H^H$, respectively. Similarly, $H^H B = T_H S_H U_H^H B$, wherein $T_H$, $S_H$, $B^H U_H$ are left singular matrix, diagonal singular values and right singular matrix of $H^H B$, respectively, when $B_H B = I_{Ns}$. In general, the left singular matrix $U_H$ and the right singular matrix $T_H$ of the original channel matrix can be determined based on HB and $H_H B$. Accordingly, the MIA and VIA processes for determining V and W according to the invention, do not require full (complete) SVD of the original channel matrix H, as detailed below.

MIA Process for Obtaining V and W

Figure 2:
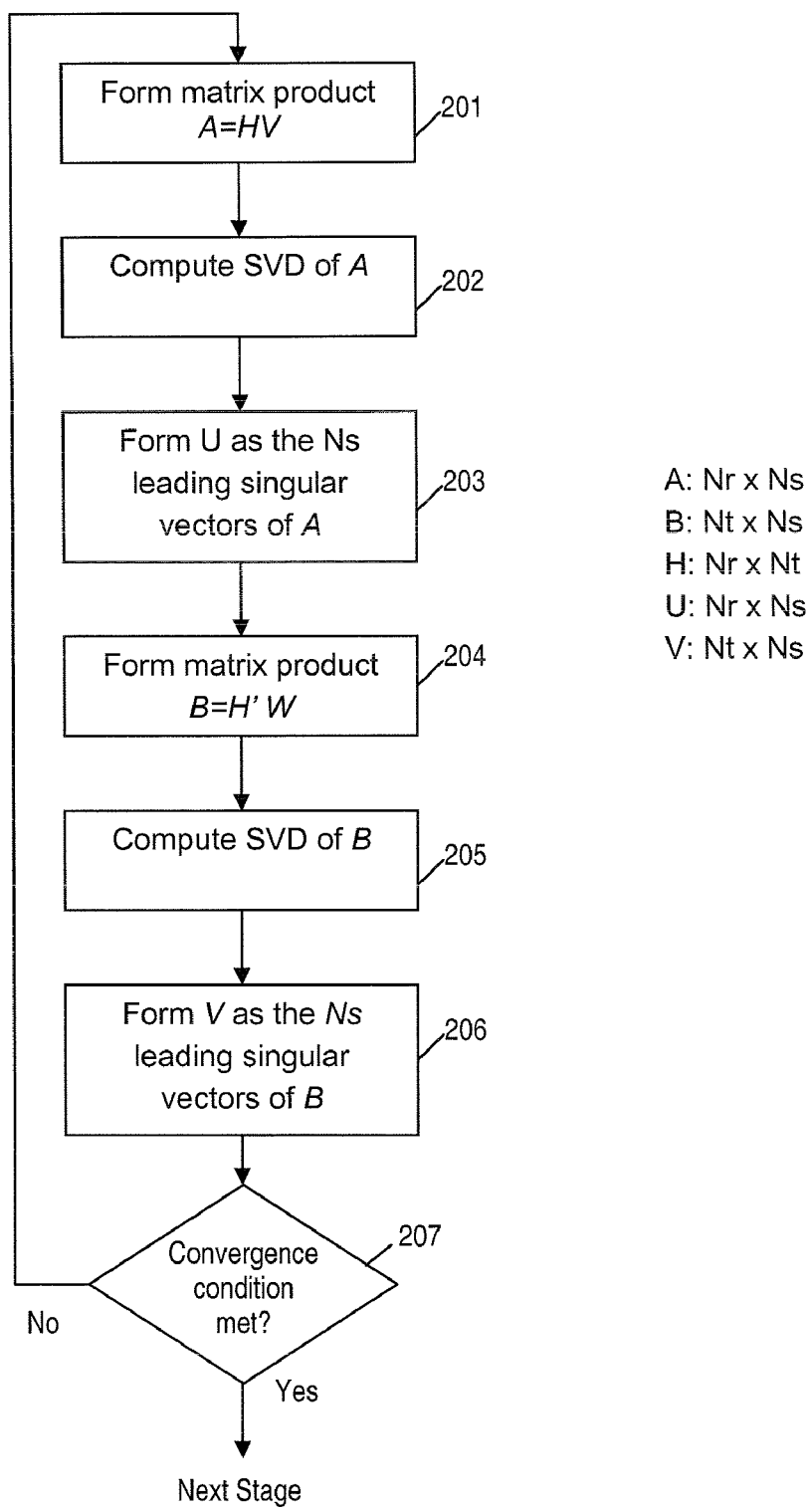
FIG. 2 shows a flowchart of a matrix iterative process for determining transmit and receive multi-beamforming coefficients, according to an embodiment of the invention.
Figure 3:
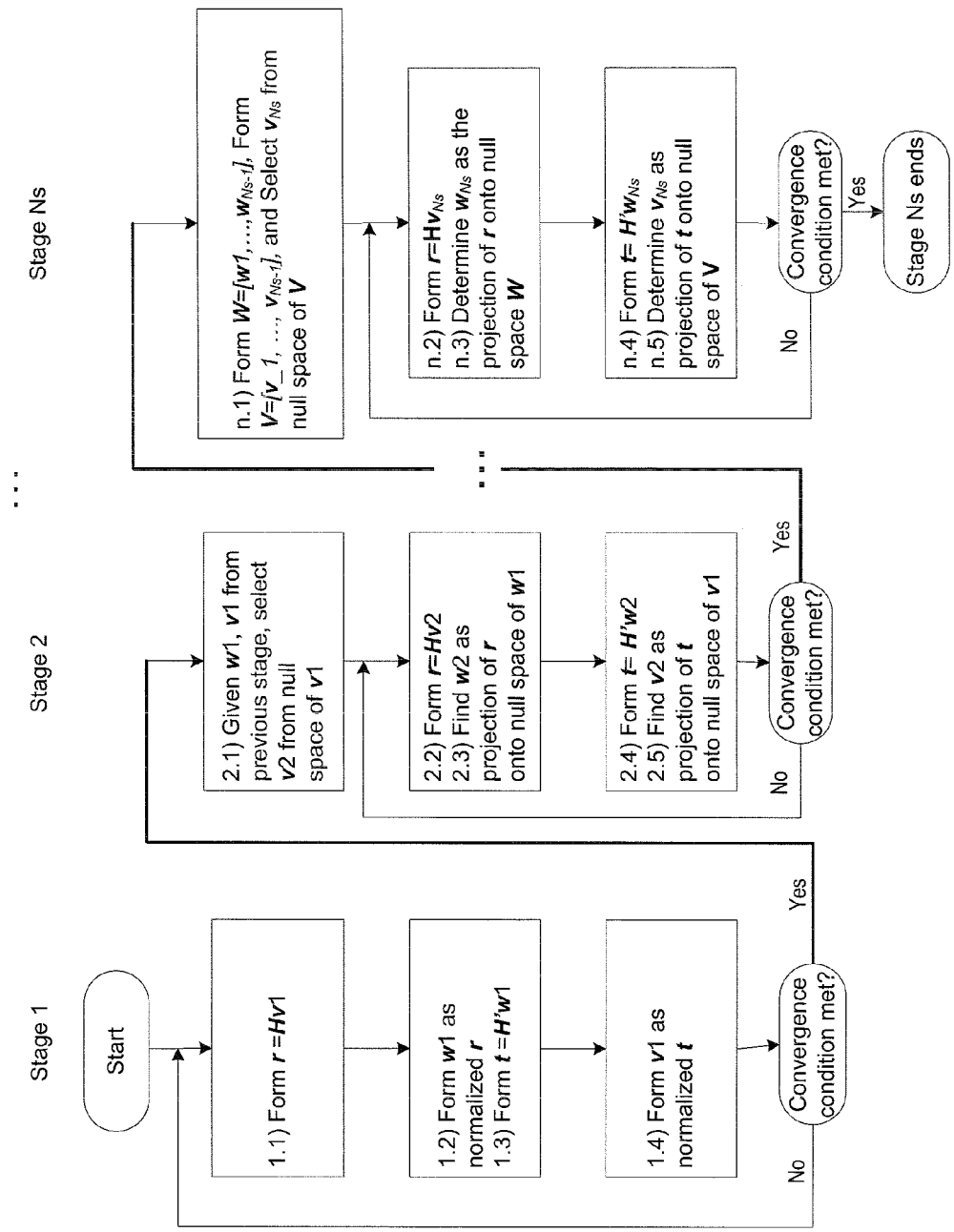
FIG. 3 shows a flow chart of a vector iterative process for determining transmit and receive multi-beamforming coefficients, according to an embodiment of the invention.

In one example implementation of the MIA process according to the invention, initially the channel matrix H is computed by selecting an arbitrary semi-unitary matrix as V. For example, V can be initially selected as the first Ns columns of an identity matrix of size N×N. Referring to FIG. 2, an example MIA process 200 involves:

Block 201. Multiply the matrix H with matrix V to obtain a product matrix A=HV as an N×As matrix.

Block 202: Calculate SVD of the product matrix A (this has a computation complexity on the order of N×$Ns^2$, where Ns<N).

Block 203: Collect the Ns leading singular vectors of matrix A to form a new matrix W of receive multi-beamforming coefficients, as an N×Ns matrix.

Block 204: Multiply the matrix H' with newly formed matrix W to obtain matrix B=H'W, wherein the product matrix B is an N×Ns matrix.

Block 205: Calculate SVD of the matrix B (this has computation complexity on the order of N×$Ns^2$).

Block 206: Collect the Ns leading singular vectors of matrix B to form an updated matrix V of transmit multi-beamforming coefficients, as an N×Ns matrix.

Block 207: If convergence condition not met, then proceed back to block 201.

Each repetition of blocks 201-206 is one iteration, wherein normally a few iterations (e.g., $N_{iter}$=3 to 4 iterations) for the process to converge to a solution for V and W. Note that instead of calculating the full SVD of H (which costs complexity on the order of $N^3$), the MIA process costs complexity only on the order of $2 \times Ns^2 \times N \times_{iter}$, where $N_{iter}$ is the number of iterations.

When Ns=1, $N_{iter}$=4, N=36, for example, the achieved computation complexity reduction in determining V and W is thus on the order of 162 times compared to full SVD of H for determining V and W. When Ns=2; $N_{iter}$=4, N=36, for example the achieved computation complexity reduction is on the order of 41 times. Thus, it is clear that the MIA process provides large complexity reduction in obtaining the optimal solution of V and W. In general, when Nt and Nr are not equal, the computation complexity using full SVD of H is min(Nt× Nr, $Nr^2$×Nt), whereas the computation complexity of the MIA process is $Ns^2$×(Nt+Nr)×$N_{iter}$. These computation complexity comparisons are shown by example in Table 1 below.

TABLE 1

Computational complexity comparison between the full SVD and matrix iterative algorithm

| | full SVD | MIA |
|---|---|---|
| Nt = Nr = N | $N^3$ | $2 \times Ns^2 \times N \times N_{iter}$ |
| Nt, Nr different | min($Nt^2 \times Nr$, $Nr^2 \times Nt$) | $Ns^2 \times (Nt + Nr) \times N_{iter}$ |
| Nt = Nr = 36, $N_{iter}$ = 4, Ns = 1 | 46656 | 288 |
| Nt = Nr = 36, $N_{iter}$ = 4, Ns = 2 | 46656 | 1152 |

VIA Process for Obtaining V and W

Using the VIA process according to the invention, V and W are obtained without requiring any SVD operation. The general process steps involves selecting an initial V, and predetermining number of stages, wherein each stage includes iteratively communicating between Tx and Rx, wherein in each iteration the V and W are orthogonal to prior iteration Vs and Ws. The VIA process includes Ns stages. In the special case Ns=1, only one stage is present. The Ns stages are carried out in a serial manner, each stage receiving input from the last stage (e.g., complete Ns−1 stage first in order to start Ns stage). Referring to the process 300 in FIG. 3, the stages of the VIA process are described below.

Stage 1

Initially in Stage 1, an arbitrary unit normal vector of dimension Nt is selected as the initialization of V. The initial value of V (i.e., $v_1$) may be the first column of the identity matrix of size Nt×Nt. Stage 1 includes:

Step 1.1: Multiply matrix H and vector $v_1$ and obtain $r = Hv_1$.

Step 1.2: Form vector $w_1$ as normalized version of r.

Step 1.3: Multiply matrix H' and vector $w_1$ and obtain $t = H'w_1$.

Step 1.4: Form updated vector $v_1$ as normalized version of t.

Step 1.5: Repeat steps 1.1 through 1.4.

In one embodiment, $r=Hv_1$ can be formed at the receiver when $v_1$ is sent from the transmitter, without the need to know H explicitly. Similarly, $t'=Hw_1'$ can be formed (and t can be computed easily from t') at the receiver when $\underline{w}_1'$ is sent from the transmitter without the need to know H explicitly. Alternatively, if the backward channel is reciprocal to the forward channel, meaning that the backward channel is H', then $t=H'w_1$ can be formed at the transmitter when $w_1$ is sent from the receiver without the need to know H (or H') explicitly.

Each repetition of steps 1.1 through 1.4 is one iteration, wherein normally a few iterations (e.g., 3 to 4 iterations) are required for convergence of $v_1$ and $w_1$. The condition of convergence is implementation dependent. For example, a maximum number of iterations (e.g., 4 iterations) can be set to test the convergence condition. Alternatively, the achieved SNR percentage change (e.g., 2% change) relative to the previous iteration can be set to test the convergence condition.

Normally, Stage 1 may safely stop after four iterations, arriving at a converged $v_1$ and $w_1$. Stage 1 is the only stage needed if Ns=1 (Stage 1 is needed for all possible value of Ns).

Each stage involves multiple power iterations, each power iteration including transmitting $v_i$ through the channel H, which is received as $w_i$ at the receiver (i is the stage index, i= 1, . . . , Ns). Then, $w_i$ is transmitted back through channel H to the transmitter and received as $v_i$. For example, $v_1$ is transmitted from Tx through the channel H and is received at Rx as $w_1$ (after normalization). Then, $w_1$ is sent back from Rx through H and received at Tx as $v_1$.

Stage 1 generates (outputs) vectors $w_1$ and $v_1$ of dimensions Nr×1 and Nt×1, respectively. The process proceeds to Stage 2 with the output from Stage 1.

Stage 2

Initially in Stage 2, it is assumed that $v_1$ and $w_1$ are obtained as per Stage 1. The actual channel H need not be explicitly estimated in the multi-stage procedure. The following terminology is provided for better understanding.

Given a vector $v_1$ in the Nt dimensional space, the null space of $v_1$, denoted Null($v_1$), is the collection of all vectors x that satisfy $x'v_1=0$ (in geometry, the projection of $v_1$ onto Null($v_1$) is zero). Given an arbitrary vector a, the projection of a onto vector $v_1$ can be expressed by a linear algebra expression as: proj(a, $v_1$)=($a'v_1$)$v_1$. Further, for an arbitrary vector a, the vector can be expressed as: a=proj(a, $v_1$)+proj(a, Null($v_1$)), wherein the vector a can be split into a sum of two vectors. One of the vectors is the projection of a onto $v_1$, the other vector is the projection of a onto the null space of $v_1$, wherein in linear algebra: proj(a, Null($v_1$))=a−proj(a, $v_1$). With the above terms defined, the steps involved in Stage 2 include:

Step 2.1: Select an arbitrary initial $v_2$ from null space of $v_1$.
Step 2.2: Form matrix product $r=Hv_2$.
Step 2.3: Determine vector $w_2$ as projection of r onto null space of $w_1$. Normalize $w_2$.
Step 2.4: Form matrix product $t=H'w_2$.
Step 2.5: Determine $v_2$ as a projection of t onto null space of $v_1$. Normalize $v_2$.
Step 2.6. Repeat steps 2.2 through 2.5.

In one embodiment, $r=Hv_2$ can be formed at the receiver when $v_2$ is sent from the transmitter, without the need to know H explicitly. Similarly, $t'=Hw_2'$ can be formed (and t can be computed easily from t') at the receiver when $w_2'$ is sent from the transmitter without the need to know H explicitly. Alternatively, if the backward channel is reciprocal to the forward channel, meaning that the backward channel is H', then $t=H'w_2$ can be formed at the transmitter device when $w_2$ is sent from the receiver without the need to know H (or H') explicitly.

Each repetition of steps 2.2 through 2.5 is one power iteration, wherein normally only a few iterations (e.g., 3 to 4 iterations) lead to convergence of $v_2$ and $w_2$. Normally, Stage 2 may safely stop after 4 iterations, arriving at a converged $v_2$ and $w_2$. Stage 2 involves power iteration with a constraint that v2 is orthogonal to $v_1$, and $w_2$ is orthogonal to $w_1$.

Stage 2 generates vectors $w_2$ and $v_2$ of dimensions Nr×1 and Nt×1, respectively. Coupled with output from Stage 1, then after Stage 2 the following vectors are generated: $w_1$, $w_2$ each of dimension Nr×1, and v1, v2, each dimension Nt×1. The process then proceeds to the next stage with the output from Stages 1 and 2 (i.e., $v_1$, $v_2$, $w_1$, $w_2$). In the following, the next stage is generally described as Stage n+1 (representing (n+1)th stage).

Stage n+1

Initially in Stage n+1, it is assumed that $w_1, w_2, \ldots, w_n$, and $v_1, v_2, \ldots, v_n$ are available from previous stages. As per the construction in previous stages, $v_1, v_2, \ldots, v_n$ are orthogonal to each other meaning $v_i'v_j=0$ for any i≠j. Similarly, $w_1, w_2, \ldots, w_n$ are orthogonal to each other meaning $w_i'w_j=0$ for any i≠j. Stage n+1 includes:

Step n.1: Form V=[$v_1, v_2, \ldots, v_n$], form W=[$w_1, w_2, \ldots, w_n$] and select $v_{n+1}$ from null space of V.
Step n.2: Form matrix product $r=Hv_{n+1}$.
Step n.3: Determine $w_{n+1}$ as projection of r onto null space of W. Normalize $w_{n+1}$.
Step n.4: Form matrix product $t=H'w_{n+1}$.
Step n.5: Determine $v_{n+1}$ as projection of t onto null space of V. Normalize $v_{n+1}$.
Step n.6: Repeat steps n.2 through n.5.

In one embodiment, $r=Hv_{n+1}$ can be formed at the receiver when $v_{n+1}$ is sent from the transmitter, without the need to know H explicitly. Similarly, $t'=Hw_{n+1}'$ can be formed (and t can be computed easily from t') at the receiver when $w_{n+1}'$ is sent from the transmitter without the need to know H explicitly. Alternatively, if the backward channel is reciprocal to the forward channel, meaning that the backward channel is H', then $t=H' w_{n+1}$ can be formed at the transmitter device when $w_{n+1}$ is sent from the receiver without the need to know H (or H') explicitly.

Each repetition of steps n.2 through n.5 is one iteration, wherein normally only a few iterations (e.g., 3 to 4 iterations) lead to convergence of $v_{n+1}$ and $w_{n+1}$. Normally, Stage n+1 may safely stop after 4 iterations, arriving at a converged $v_{n+1}$ and $w_{n+1}$. Stage n+1 involves power iteration with a constraint that $v_{n+1}$ is orthogonal to $v_1, v_2, \ldots, v_n$ and that $w_{n+1}$ is orthogonal to $w_1, w_2, \ldots, w_n$. In each stage i, after stage 1, $v_i$ is orthogonal to all prior stage v vectors, and $w_i$ is orthogonal to all prior stage w vectors.

Thus, carrying out Stage 1 through Stage Ns, provides transmit multi-beamforming vectors $v_1, v_2, \ldots, v_{Ns}$, and receive multi-beamforming vectors $w_1, w_2, \ldots, w_{Ns}$. From the vectors, the matrix V=[$v_1, v_2, \ldots, v_{Ns}$] of transmit multi-beamforming coefficients, and the matrix W=[$w_1, w_2 \ldots, w_{Ns}$] of receive multi-beamforming coefficients, are obtained. No SVD operation is required in the VIA process.

Multi-beamforming according to embodiments of the invention is useful for ultra high throughput communication in WirelessHD next generation (WiHD-NG) as well as IMT advanced standardization, where up to 6 Gbps throughput or even more is targeted at static environments.

Figure 4:
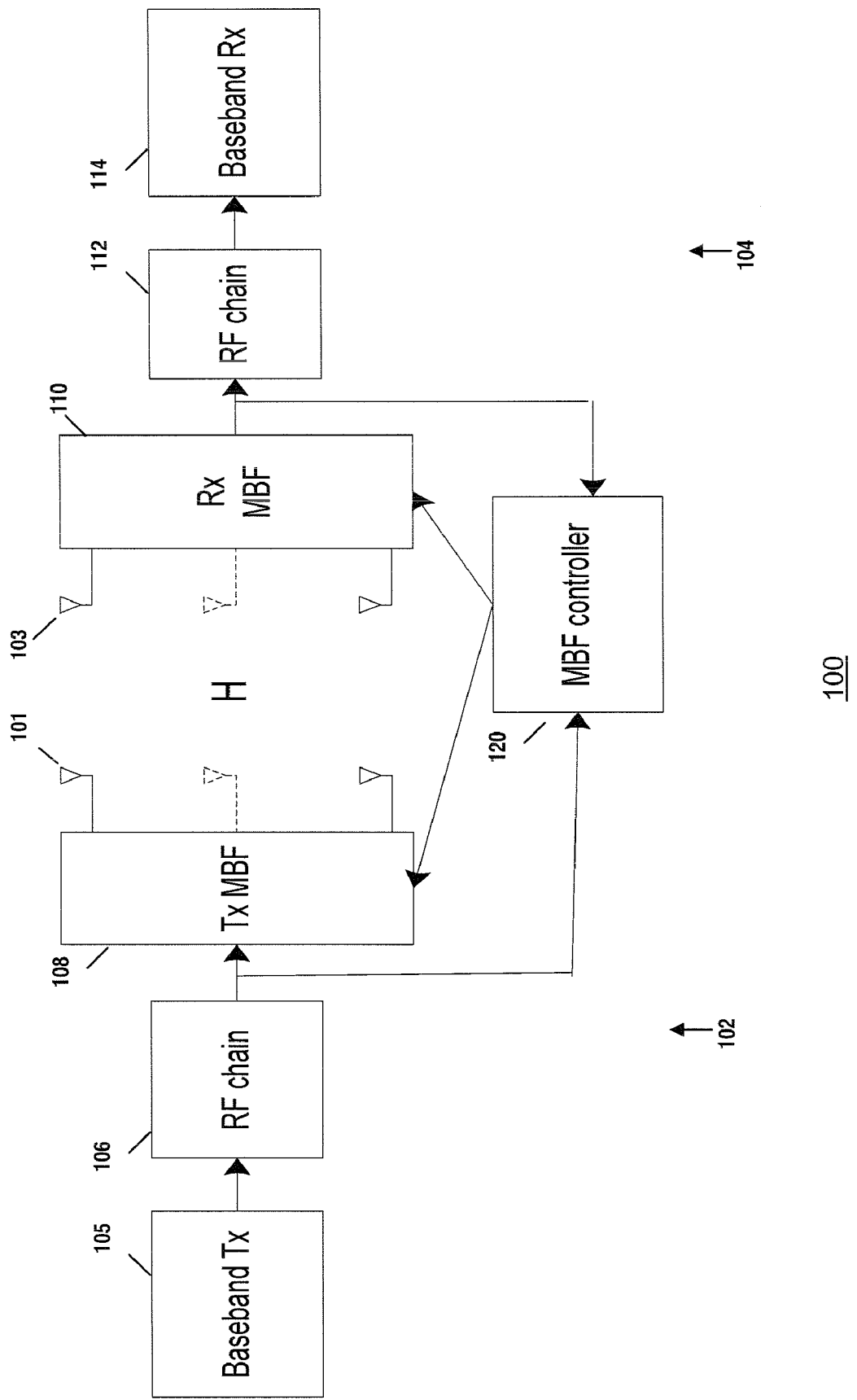
FIG. 4 shows a functional block diagram of a communication system, according to an embodiment of the invention.

FIG. 4 shows a functional block diagram of a communication system 100 with multiple (Nt) transmit antennas 101 of a transmitter (Tx) module 102, and multiple (Nr) receive antennas 103 of a receiver (Rx) module 104. The system 100 implements antenna training and payload data communication protocol for multi-beamforming (MBF), according to the present invention.

The Tx module 102 includes a baseband transmitter Tx 105, a radio frequency (RF) chain 106 and a transmit multi-beamforming (Tx MBF) module 108. The Rx module 104 includes a receive multi-beamforming (Rx MBF) module 110, an RF chain 112 and a baseband receiver Rx 114.

The Tx MBF 108 and the Rx MBF 110 are controlled by a control signal from a MBF controller 120, the control signal representing a group of MBF coefficients (i.e., Tx MBF vector V and Rx MBF vector 9). In the antenna training phase, the MBF controller 120 implements transmit training function 152 and (FIG. 1) and receive training function 154 for acquisition of MBF vectors V and W.

Then, in the data payload communication phase, the MBF controller 120 provides the MBF vectors V and W to the Tx MBF 108 and the Rx MBF 110, respectively, for beam steering in MBF communication of the data payload. In operation for data payload communication phase using V and W, first the baseband Tx 105 generates digital baseband signals, wherein the signals are fed through the RF chain 106 for conversion to analog by a digital-to-analog function of the RF chain 106 and modulation using a high frequency carrier. The modulated analog signal from the RF chain 106 is beamformed by the Tx MBF 108 and transmitted via a channel H through multiple transmit antenna elements 101. Tx beamforming module 108 implements multiplying the input signal by a number of different Tx MBF coefficients V obtained by antenna training using the aforementioned MIA or VIA processes, and routing the corresponding products to the antenna elements 101.

The transmitted signals propagate through the channel H, and are received by the receive antenna elements 103. The received signals on multiple receive antenna elements are combined by the Rx MBF 110 into a single combined signal. Rx MBF 110 collects multiple received signals from multiple antenna elements 103, multiplying signals by Rx coefficients W obtained by antenna training using the aforementioned MIA or VIA processes, and sums the products. The combined signal is converted to digital format by an analog-to-digital conversion function of the RF chain 112. Specifically, the RF cain 112 receives an analog signal from the air, demodulates it from the high frequency carrier, and converts it to a digital signal for further processing. The digital signal is processed by the baseband Rx 114 where final information is extracted. The present invention is useful with both analog and digital beamforming communication systems.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Though the present invention has been described with reference to certain versions thereof; however, other versions are possible. Therefore, the spirit and scope of the appended claims should not be limited to the description of the preferred versions contained herein.

What is claimed is:

1. A method of antenna training for communicating in parallel multiple data streams using multi-beamforming between multiple-input multiple-output source and destination stations, comprising:
    estimating essentially optimal multi-beamforming vectors by multiple stages, with each stage including:
        (a) a source station obtaining a first transmit beamforming vector that is orthogonal to all, if any, prior transmit beamforming vectors from earlier stages;
        (b) the source station transmitting a training sequence modulated by the first transmit beamforming vector in the spatial domain;
        (c) a destination station receiving the training sequence modulated by the first transmit beamforming vector, and obtaining a first receive beamforming vector therefrom, such that the first receive beamforming vector is orthogonal to all, if any, prior receive beamforming vectors;
        (d) the source station transmitting a training sequence modulated by different transmit beamforming vectors;
        (e) the destination station receiving said training sequence modulated by different transmit beamforming vectors, and estimating a second transmit beamforming vector therefrom; and
        (f) the destination station feeding back the estimated second transmit beamforming vector to the source station, whereby the source station decodes/transforms back the fed back second transmit beamforming vector, wherein the second transmit beamforming vector is orthogonal to all, if any, prior transmit beamforming vectors in earlier stages.

2. The method of claim 1, wherein in step (e) the estimated transmit beamforming vector is not orthogonal to prior transmit beamforming vectors from earlier iterations of the same stage.

3. The method of claim 1 wherein steps (a) to (f) are repeated multiple times for each stage.

4. The method of claim 3 wherein a first stage is, followed serially by number of stages up to the number of transmit input streams, less one, in an increasing order.

5. The method of claim 1 wherein repetition of steps (a), (b), (c), and steps (d), (e), (f), in each iteration stage are exchangeable.

6. The method of claim 1 wherein the steps (d), (e), (f), (a), (b), (c) are repeated.

7. The method of claim 1 wherein the number of iterations in a stage is different from the number of iterations in one or more other stages.

8. A method of antenna training for communicating in parallel multiple data streams using multi-beamforming between multiple-input multiple-output source and destination stations, comprising:
    estimating essentially optimal multi-beamforming vectors by multiple stages, with each stage including:
        (a) a source station obtaining a first transmit beamforming vector that is orthogonal to all, if any, prior transmit beamforming vectors in earlier stages;
        (b) the source station transmitting a training sequence modulated by the obtained transmit beamforming vector in the spatial domain;
        (c) a destination station receiving the training sequence modulated by the obtained transmit beamforming vector, and computing a receive beamforming vector therefrom, such that the computed receive beamforming vector is orthogonal to all, if any, prior receive beamforming vectors;

(d) the destination station transmitting a training sequence modulated by the computed receive beamforming vector, or complex conjugate of the computed receive beamforming vector, in the spatial domain; and (e) the source station receiving the training sequence from the destination station and estimating a second transmit beamforming vector therefrom, wherein the second transmit beamforming vector is orthogonal to all, if any, prior transmit beamforming vectors in earlier stages.

9. The method of claim 8 wherein in step (e) the estimated transmit beamforming vector is not orthogonal to prior transmit beamforming vectors from earlier iterations of the same stage.

10. The method of claim 8, wherein steps (a) to (e) are repeated multiple times for each stage.

11. The method of claim 10 wherein a first stage is, followed serially by number of stages up to the number of transmit input streams, less one, in an increasing order.

12. The method of claim 8 wherein repetition of steps (a), (b), (c), and steps (d), (e), in each iteration stage are exchangeable.

13. The method of claim 8 wherein the steps (d), (e), (a), (b), (c) are repeated.

14. The method of claim 8 wherein the number of iterations in a stage is different from the number of iterations in one or more other stages.

15. A communication system comprising:
multiple-input multiple-output source and destination stations, configured for antenna training to perform communication of parallel multiple data streams therebetween, estimating essentially optimal multi-beamforming vectors by multiple stages with each stage including:

(a) the source station obtaining a first transmit beamforming vector that is orthogonal to all, if any, prior transmit beamforming vectors from earlier stages;

(b) the source station transmitting a training sequence modulated by the first transmit beamforming vector in the spatial domain;

(c) the destination station receiving the training sequence modulated by the first transmit beamforming vector, and obtaining a first receive beamforming vector therefrom, such that the first receive beamforming vector is orthogonal to all, if any, prior receive beamforming vectors;

(d) the source station transmitting a training sequence modulated by different transmit beamforming vectors;

(e) the destination station receiving said training sequence modulated by different transmit beamforming vectors, and estimating a second transmit beamforming vector therefrom; and (f) the destination station feeding back the estimated second transmit beamforming vector to the source station, whereby the source station decodes/transforms back the fed back second transmit beamforming vector, wherein the second transmit beamforming vector is orthogonal to all, if any, prior transmit beamforming vectors from earlier stages.

16. The system of claim 15 wherein in (e) the estimated transmit beamforming vector is not orthogonal to prior transmit beamforming vectors from earlier iterations of the same stage.

17. The system of claim 15 wherein (a) to (f) are repeated multiple times for each stage.

18. The system of claim 17 wherein a first stage is, followed serially by number of stages up to the number of transmit input streams, less one, in an increasing order.

19. The system of claim 15 wherein repetition of (a), (b), (c), and (d), (e), (f), in each iteration stage are exchangeable.

20. The system of claim 15 wherein (d), (e), (f), (a), (b), (c) are repeated.

21. The system of claim 15 wherein the number of iterations in a stage is different from the number of iterations in one or more other stages.

22. A communication system comprising:
multiple-input multiple-output source and destination stations, configured for antenna training to perform communication of parallel multiple data streams therebetween, estimating essentially optimal multi-beamforming vectors by multiple stages, with each stage including:

(a) the source station obtaining a first transmit beamforming vector that is orthogonal to all, if any, prior transmit beamforming vectors in earlier stages;

(b) the source station transmitting a training sequence modulated by the first transmit beamforming vector in the spatial domain;

(c) the destination station receiving the training sequence modulated by the first transmit beamforming vector, and computing a receive beamforming vector therefrom, such that the computed receive beamforming vector is orthogonal to all, if any, prior receive beamforming vectors;

(d) the destination station transmitting a training sequence modulated by the computed receive beamforming vector, or complex conjugate of the computed receive beamforming vector, in the spatial domain; and (e) the source station receiving the training sequence from the destination station and estimating a second transmit beamforming vector therefrom, wherein the second transmit beamforming vector is orthogonal to all, if any, prior transmit beamforming vectors in earlier stages.

23. The system of claim 22 wherein in (e) the estimated transmit beamforming vector is not orthogonal to prior transmit beamforming vectors from earlier iterations of the same stage.

24. The system of claim 22 wherein (a) to (e) are repeated multiple times for each stage.

25. The system of claim 24 wherein a first stage is, followed serially by number of stages up to the number of transmit input streams, less one, in an increasing order.

26. The system of claim 25 wherein repetition of (a), (b), (c), and (d), (e), in each iteration stage are exchangeable.

27. The system of claim 22 wherein (d), (e), (a), (b), (c) are repeated.

28. The system of claim 22 wherein the number of iterations in a stage is different from the number of iterations in one or more other stages.

29. A transmitter station, comprising a transmit training module for antenna training in multi-dimensional beamforming multiple-input multiple-output data communication of multiple data streams over an antenna array, the transmit training module configured to multiple stages in estimating transmit multi-dimensional beamforming coefficients by serially performing multiple training stages, each stage including multiple power iterations for determining a set of transmit beamforming vectors, the transmit beamforming vector being orthogonal to all, if any, prior transmit beamforming vectors in any prior stages, until the vectors converge.

30. A receiver station, comprising a receive training module for antenna training in multi-dimensional beamforming multiple-input multiple-output data communication of multiple data streams over an antenna array, the receive training module configured to multiple stages in estimating receive multi-dimensional beamforming vectors by serially performing multiple training stages, each stage including multiple power iterations for determining a set of receive beamforming vectors the receive beamforming vector being orthogonal to all, if any, prior receive beamforming vectors in any prior stages, until the vectors converge.

31. A communication system comprising:
   a transmit training module for antenna training in multi-dimensional beamforming multiple-input multiple-output data communication of multiple data streams over an antenna array, the transmit training module configured for multiple training stages in estimating transmit multi-dimensional beamforming vectors by serially performing multiple stages, each stage including multiple power iterations for determining a set of transmit beamforming vectors the transmit beamforming vector being orthogonal to all prior transmit beamforming vectors in any prior stages, until the vectors converge; and
   a receive training module for antenna training in multi-dimensional beamforming multiple-input multiple-output data communication of multiple data streams over an antenna array, the receive training module configured for multiple training stages in estimating receive multi-dimensional beamforming vectors by serially performing multiple training stages, each stage including multiple power iterations for determining a set of receive beamforming vectors the receive beamforming vector being orthogonal to all prior receive beamforming vectors in any prior stages, until the vectors converge.

32. A method of antenna training for communicating in parallel multiple data streams using multi-beamforming between multiple-input multiple-output source and destination stations, comprising:
   estimating essentially optimal multi-beamforming vectors by a single stage, including:
   (a) a source station obtaining a first set of transmit beamforming vectors that are orthogonal to each other;
   (b) the source station transmitting multiple training sequences modulated by each of the first set of transmit beamforming vectors in the spatial domain individually;
   (c) a destination station receiving the training sequences, and obtaining a first set of receive beamforming vectors therefrom, such that the first set of receive beamforming vectors are orthogonal to each other;
   (d) the destination station transmitting multiple training sequences modulated by each of the computed receive beamforming vectors in the spatial domain individually;
   (e) the source station receiving the training sequences and estimating a second set of transmit beamforming vectors therefrom, wherein the second set of transmit beamforming vectors are orthogonal to each other; and
   (f) the above steps (a-e) are repeated a number of times.

33. A communication system comprising:
   multiple-input multiple-output source and destination stations, configured for antenna training to perform communication of parallel multiple data streams therebetween, estimating essentially optimal multi-beamforming vectors including:
   (a) a source station obtaining a first set of transmit beamforming vectors that are orthogonal to each other;
   (b) the source station transmitting multiple training sequences modulated by each of the first set of transmit beamforming vectors in the spatial domain individually;
   (c) a destination station receiving the training sequences, and obtaining a first set of receive beamforming vectors therefrom, such that the first set of receive beamforming vectors are orthogonal to each other;
   (d) the destination station transmitting multiple training sequences modulated by each of the computed receive beamforming vectors in the spatial domain individually;
   (e) the source station receiving the training sequences and estimating a second set of transmit beamforming vectors therefrom, wherein the second set of transmit beamforming vectors are orthogonal to each other; and
   (f) the above steps (a-e) are repeated a number of times.

* * * * *